US009996577B1

(12) United States Patent
Diep et al.

(10) Patent No.: US 9,996,577 B1
(45) Date of Patent: Jun. 12, 2018

(54) SYSTEMS AND METHODS FOR GRAPHICALLY FILTERING CODE CALL TREES (71) Applicant: Dell Software Inc., Aliso Viejo, CA (US)

(72) Inventors: Gia-Duong Diep, Toronto (CA); Joseph Rustad, Toronto (CA)

(73) Assignee: Quest Software Inc., Aliso Viejo, CA (US)

( * ) Notice: Subject to any disclaimer, the term of this patent is extended or adjusted under 35 U.S.C. 154(b) by 383 days.

(21) Appl. No.: 14/619,897

(22) Filed: Feb. 11, 2015

(51) Int. Cl.
*G06F 17/30* (2006.01)
*G06F 3/0484* (2013.01)

(52) U.S. Cl.
CPC .... *G06F 17/30371* (2013.01); *G06F 3/04842* (2013.01)

(58) Field of Classification Search
CPC ............. G06F 17/30371; G06F 3/04842
USPC ............................................ 707/703
See application file for complete search history.

(56) References Cited

U.S. PATENT DOCUMENTS

| | | |
|---|---|---|
| 3,701,971 A | 10/1972 | Sanner et al. |
| 3,839,707 A | 10/1974 | Woodward et al. |
| 4,468,728 A | 8/1984 | Wang |
| 4,683,532 A | 7/1987 | Yount et al. |
| 4,937,740 A | 6/1990 | Agarwal et al. |
| 5,103,394 A | 4/1992 | Blasciak |
| 5,321,838 A | 6/1994 | Hensley et al. |
| 5,375,199 A | 12/1994 | Harrow et al. |
| 5,432,932 A | 7/1995 | Chen et al. |
| 5,450,586 A | 9/1995 | Kuzara et al. |
| 5,493,658 A | 2/1996 | Chiang et al. |
| 5,506,955 A | 4/1996 | Chen et al. |
| 5,517,629 A | 5/1996 | Boland |
| 5,528,753 A | 6/1996 | Fortin |
| 5,539,907 A | 7/1996 | Srivastava et al. |
| 5,572,640 A | 11/1996 | Schettler |
| 5,600,789 A | 2/1997 | Parker et al. |
| 5,623,598 A | 4/1997 | Voigt et al. |
| 5,649,187 A | 7/1997 | Hornbuckle |

(Continued)

FOREIGN PATENT DOCUMENTS

WO WO-2013162596 A1 10/2013

OTHER PUBLICATIONS

U.S. Appl. No. 13/745,677, Ostermeyer.

(Continued)

*Primary Examiner* — Thanh-Ha Dang
(74) *Attorney, Agent, or Firm* — Winstead PC (57) ABSTRACT In an embodiment, a method includes accessing a call tree for a transaction, wherein the call tree traces routines called during execution of the transaction. The method further includes generating a graphical representation of the call tree in relation to two or more performance properties. In addition, the method includes causing the graphical representation of the call tree to be displayed. Further, the method includes allowing a user to graphically select a group of routines from the graphical representation of the call tree. In addition, the method includes creating a filtered call tree comprising the graphically selected group of routines. Furthermore, the method includes generating a drill-down visualization of the filtered call tree. The method also includes causing the drill-down visualization to be displayed.

19 Claims, 8 Drawing Sheets

(56) References Cited

U.S. PATENT DOCUMENTS

| | | | |
|---|---|---|---|
| 5,671,351 A | 9/1997 | Wild et al. | |
| 5,673,386 A | 9/1997 | Batra | |
| 5,684,945 A | 11/1997 | Chen et al. | |
| 5,701,137 A | 12/1997 | Kiernan et al. | |
| 5,708,775 A | 1/1998 | Nakamura | |
| 5,715,388 A | 2/1998 | Tsuchihashi | |
| 5,715,415 A | 2/1998 | Dazey et al. | |
| 5,720,018 A | 2/1998 | Muller et al. | |
| 5,740,357 A | 4/1998 | Gardiner et al. | |
| 5,748,881 A | 5/1998 | Lewis et al. | |
| 5,752,062 A | 5/1998 | Gover et al. | |
| 5,768,501 A | 6/1998 | Lewis | |
| 5,872,909 A | 2/1999 | Wilner et al. | |
| 5,881,306 A | 3/1999 | Levine et al. | |
| 5,903,453 A | 5/1999 | Stoddard, II | |
| 5,903,898 A | 5/1999 | Cohen et al. | |
| 5,911,048 A | 6/1999 | Graf | |
| 5,960,425 A | 9/1999 | Buneman et al. | |
| 5,978,594 A | 11/1999 | Bonnell et al. | |
| 5,983,366 A | 11/1999 | King | |
| 6,018,567 A | 1/2000 | Dulman | |
| 6,029,170 A | 2/2000 | Garger et al. | |
| 6,035,412 A | 3/2000 | Tamer et al. | |
| 6,128,016 A | 10/2000 | Coelho et al. | |
| 6,148,335 A | 11/2000 | Haggard et al. | |
| 6,173,322 B1 | 1/2001 | Hu | |
| 6,195,092 B1 | 2/2001 | Dhond et al. | |
| 6,199,199 B1 | 3/2001 | Johnston et al. | |
| 6,223,171 B1 | 4/2001 | Chaudhuri et al. | |
| 6,243,105 B1* | 6/2001 | Hoyer | G06T 11/206 345/418 |
| 6,330,008 B1 | 12/2001 | Razdow et al. | |
| 6,351,754 B1 | 2/2002 | Bridge, Jr. et al. | |
| 6,381,628 B1 | 4/2002 | Hunt | |
| 6,473,791 B1 | 10/2002 | Al-Ghosein et al. | |
| 6,538,669 B1 | 3/2003 | Lagueux, Jr. et al. | |
| 6,543,006 B1 | 4/2003 | Zundel et al. | |
| 6,594,655 B2 | 7/2003 | Tal et al. | |
| 6,622,221 B1 | 9/2003 | Zahavi | |
| RE38,270 E | 10/2003 | Nakajima | |
| 6,633,640 B1* | 10/2003 | Cohen | H04M 3/5237 379/112.06 |
| 6,654,830 B1 | 11/2003 | Taylor et al. | |
| 6,751,555 B2 | 6/2004 | Poedjono | |
| 6,771,646 B1 | 8/2004 | Sarkissian et al. | |
| 6,833,787 B1 | 12/2004 | Levi | |
| 6,847,970 B2 | 1/2005 | Keller et al. | |
| 6,901,582 B1 | 5/2005 | Harrison | |
| 6,993,454 B1 | 1/2006 | Murstein et al. | |
| 7,010,588 B2 | 3/2006 | Martin et al. | |
| 7,103,843 B2 | 9/2006 | Hand et al. | |
| 7,127,324 B2 | 10/2006 | Batori et al. | |
| 7,274,375 B1 | 9/2007 | David | |
| 7,363,211 B1 | 4/2008 | Naganathan et al. | |
| 7,389,345 B1 | 6/2008 | Adams | |
| 7,436,822 B2 | 10/2008 | Lee et al. | |
| 7,480,647 B1 | 1/2009 | Murstein et al. | |
| 7,480,866 B2 | 1/2009 | Germain et al. | |
| 7,483,978 B2 | 1/2009 | Esfahany et al. | |
| 7,512,888 B2 | 3/2009 | Sugino et al. | |
| 7,523,128 B1 | 4/2009 | Miller et al. | |
| 7,532,642 B1 | 5/2009 | Peacock | |
| 7,557,803 B2 | 7/2009 | Furukawa et al. | |
| 7,558,790 B1 | 7/2009 | Miller et al. | |
| 7,565,610 B2 | 7/2009 | Li et al. | |
| 7,587,492 B2 | 9/2009 | Dyck et al. | |
| 7,620,984 B2 | 11/2009 | Kallahalla et al. | |
| 7,644,397 B2 | 1/2010 | Warren et al. | |
| 7,685,251 B2 | 3/2010 | Houlihan et al. | |
| 7,698,683 B1 | 4/2010 | Miller et al. | |
| 7,784,027 B2 | 8/2010 | Harrison | |
| 7,792,941 B2 | 9/2010 | Fried et al. | |
| 7,822,837 B1 | 10/2010 | Urban et al. | |
| 7,882,216 B2 | 2/2011 | Houlihan et al. | |
| 7,917,617 B1 | 3/2011 | Ponnapur et al. | |
| 7,962,590 B1 | 6/2011 | Or et al. | |
| 7,979,245 B1 | 7/2011 | Bourlatchkov et al. | |
| 8,051,162 B2 | 11/2011 | Arlitt et al. | |
| 8,051,330 B2 | 11/2011 | Cinato et al. | |
| 8,051,382 B1 | 11/2011 | Kingdom et al. | |
| 8,103,638 B2 | 1/2012 | Voznika et al. | |
| 8,103,826 B2 | 1/2012 | Kobayashi | |
| 8,112,366 B2 | 2/2012 | Hollingsworth et al. | |
| 8,155,996 B1 | 4/2012 | Cassone et al. | |
| 8,161,058 B2 | 4/2012 | Agarwal et al. | |
| 8,175,862 B1 | 5/2012 | Bourlatchkov et al. | |
| 8,175,863 B1* | 5/2012 | Ostermeyer | G06F 17/5009 703/13 |
| 8,181,154 B2 | 5/2012 | Harrison | |
| 8,185,598 B1 | 5/2012 | Golovin et al. | |
| 8,203,972 B2 | 6/2012 | Sauermann | |
| 8,217,945 B1 | 7/2012 | Moscovici | |
| 8,239,526 B2 | 8/2012 | Simpson et al. | |
| 8,255,516 B1 | 8/2012 | Zhang et al. | |
| 8,347,273 B2 | 1/2013 | Nageshappa et al. | |
| 8,364,460 B2 | 1/2013 | Ostermeyer et al. | |
| 8,423,646 B2 | 4/2013 | Jamjoom et al. | |
| 8,490,055 B2 | 7/2013 | Basak | |
| 8,555,244 B2 | 10/2013 | Harrison | |
| 8,635,498 B2 | 1/2014 | Kahana et al. | |
| RE44,964 E* | 6/2014 | Kymal | 705/7.38 |
| 8,819,673 B1 | 8/2014 | Wilkinson et al. | |
| 8,880,678 B1 | 11/2014 | Colton et al. | |
| 8,892,415 B2 | 11/2014 | Bourlatchkov et al. | |
| 8,902,248 B1 | 12/2014 | Bidarkar et al. | |
| 8,930,395 B2 | 1/2015 | Sharma et al. | |
| 9,075,911 B2 | 7/2015 | Mohan et al. | |
| 9,274,758 B1 | 3/2016 | Qin et al. | |
| 9,569,179 B1* | 2/2017 | Kachmar | |
| 2001/0018710 A1 | 8/2001 | Clarke et al. | |
| 2002/0138659 A1 | 9/2002 | Trabaris et al. | |
| 2002/0175941 A1 | 11/2002 | Hand et al. | |
| 2003/0009551 A1 | 1/2003 | Benfield et al. | |
| 2003/0028630 A1 | 2/2003 | Bischof et al. | |
| 2003/0084155 A1 | 5/2003 | Graupner et al. | |
| 2003/0097438 A1 | 5/2003 | Bearden et al. | |
| 2003/0101262 A1 | 5/2003 | Godwin | |
| 2003/0126256 A1 | 7/2003 | Cruickshank et al. | |
| 2003/0149753 A1 | 8/2003 | Lamb | |
| 2003/0204588 A1 | 10/2003 | Peebles et al. | |
| 2003/0225563 A1 | 12/2003 | Gonos | |
| 2004/0006763 A1 | 1/2004 | Van De Vanter et al. | |
| 2004/0012637 A1 | 1/2004 | Alford et al. | |
| 2004/0030592 A1 | 2/2004 | Buck et al. | |
| 2004/0039728 A1 | 2/2004 | Fenlon et al. | |
| 2004/0046785 A1 | 3/2004 | Keller | |
| 2004/0059812 A1 | 3/2004 | Assa | |
| 2004/0064293 A1* | 4/2004 | Hamilton | G06F 11/3409 702/182 |
| 2004/0068560 A1 | 4/2004 | Oulu et al. | |
| 2004/0102925 A1 | 5/2004 | Giffords | |
| 2004/0147265 A1 | 7/2004 | Kelley et al. | |
| 2005/0021743 A1 | 1/2005 | Fleig et al. | |
| 2005/0021748 A1 | 1/2005 | Garcea et al. | |
| 2005/0044528 A1* | 2/2005 | Olsen | G06F 8/75 717/109 |
| 2005/0060300 A1* | 3/2005 | Stolte | G06F 17/30554 |
| 2005/0111352 A1 | 5/2005 | Ho et al. | |
| 2005/0187750 A1 | 8/2005 | Satoh et al. | |
| 2005/0198649 A1 | 9/2005 | Zakonov | |
| 2005/0232227 A1 | 10/2005 | Jorgenson et al. | |
| 2006/0002478 A1 | 1/2006 | Seo | |
| 2006/0101340 A1 | 5/2006 | Sridhar et al. | |
| 2006/0168199 A1 | 7/2006 | Chagoly et al. | |
| 2006/0171334 A1 | 8/2006 | Hirata et al. | |
| 2006/0173875 A1 | 8/2006 | Stefaniak | |
| 2007/0008884 A1 | 1/2007 | Tang | |
| 2007/0028239 A1 | 2/2007 | Dyck et al. | |
| 2007/0043860 A1 | 2/2007 | Pabari | |
| 2007/0087756 A1 | 4/2007 | Hoffberg | |
| 2007/0226341 A1 | 9/2007 | Mateo | |
| 2007/0250525 A1 | 10/2007 | Sanghvi et al. | |
| 2007/0255814 A1 | 11/2007 | Green et al. | |
| 2008/0016115 A1 | 1/2008 | Bahl et al. | |

(56) References Cited

U.S. PATENT DOCUMENTS

| | | | |
|---|---|---|---|
| 2008/0077366 A1 | 3/2008 | Neuse et al. | |
| 2008/0155537 A1 | 6/2008 | Dinda et al. | |
| 2008/0162107 A1 | 7/2008 | Aniszczyk et al. | |
| 2008/0222633 A1 | 9/2008 | Kami | |
| 2008/0263073 A1 | 10/2008 | Ohba et al. | |
| 2008/0306711 A1 | 12/2008 | Bansal | |
| 2008/0320269 A1 | 12/2008 | Houlihan et al. | |
| 2009/0013281 A1 | 1/2009 | Helfman et al. | |
| 2009/0083276 A1 | 3/2009 | Barsness et al. | |
| 2009/0119301 A1* | 5/2009 | Cherkasova | G06Q 10/06 |
| 2009/0147011 A1 | 6/2009 | Buck et al. | |
| 2009/0150538 A1 | 6/2009 | Tripathi et al. | |
| 2009/0164250 A1* | 6/2009 | Hamilton | G06Q 10/06393 |
| | | | 705/3 |
| 2009/0172666 A1 | 7/2009 | Yahalom et al. | |
| 2009/0177567 A1 | 7/2009 | McKerlich et al. | |
| 2009/0199177 A1 | 8/2009 | Edwards et al. | |
| 2009/0204718 A1 | 8/2009 | Lawton et al. | |
| 2009/0210527 A1 | 8/2009 | Kawato | |
| 2009/0222558 A1 | 9/2009 | Xu et al. | |
| 2009/0241108 A1 | 9/2009 | Edwards et al. | |
| 2009/0271646 A1 | 10/2009 | Talwar et al. | |
| 2009/0300605 A1 | 12/2009 | Edwards et al. | |
| 2010/0015926 A1 | 1/2010 | Luff | |
| 2010/0114554 A1 | 5/2010 | Misra | |
| 2010/0125665 A1 | 5/2010 | Simpson et al. | |
| 2010/0153916 A1 | 6/2010 | Bhatkhande et al. | |
| 2010/0190509 A1 | 7/2010 | Davis | |
| 2010/0223609 A1 | 9/2010 | Dehaan et al. | |
| 2010/0229096 A1 | 9/2010 | Maiocco et al. | |
| 2010/0241690 A1 | 9/2010 | Kurapati et al. | |
| 2010/0315958 A1 | 12/2010 | Luo et al. | |
| 2010/0317420 A1 | 12/2010 | Hoffberg | |
| 2010/0325273 A1 | 12/2010 | Kudo | |
| 2011/0047496 A1 | 2/2011 | Harrison | |
| 2011/0066780 A1 | 3/2011 | Bruce et al. | |
| 2011/0119748 A1 | 5/2011 | Edwards et al. | |
| 2011/0125800 A1 | 5/2011 | Seager et al. | |
| 2011/0145380 A1 | 6/2011 | Glikson et al. | |
| 2011/0153724 A1 | 6/2011 | Raja et al. | |
| 2011/0161851 A1 | 6/2011 | Barber et al. | |
| 2011/0187711 A1* | 8/2011 | Giovinazzi | G06T 17/00 |
| | | | 345/419 |
| 2011/0208827 A1 | 8/2011 | Pitkow et al. | |
| 2011/0209146 A1 | 8/2011 | Box et al. | |
| 2011/0254704 A1 | 10/2011 | Fournier et al. | |
| 2011/0270566 A1 | 11/2011 | Sawada et al. | |
| 2011/0298804 A1* | 12/2011 | Hao | G06T 11/206 |
| | | | 345/440 |
| 2011/0302577 A1 | 12/2011 | Reuther et al. | |
| 2012/0005148 A1 | 1/2012 | Horvitz et al. | |
| 2012/0011254 A1 | 1/2012 | Jamjoom et al. | |
| 2012/0023429 A1 | 1/2012 | Medhi | |
| 2012/0030346 A1 | 2/2012 | Fukuda et al. | |
| 2012/0166623 A1 | 6/2012 | Suit | |
| 2012/0198073 A1 | 8/2012 | Srikanth et al. | |
| 2012/0221314 A1 | 8/2012 | Bourlatchkov et al. | |
| 2012/0222002 A1 | 8/2012 | Harrison | |
| 2012/0254900 A1 | 10/2012 | Kumar et al. | |
| 2012/0271821 A1 | 10/2012 | Qin et al. | |
| 2012/0271937 A1 | 10/2012 | Cotten et al. | |
| 2012/0284713 A1 | 11/2012 | Ostermeyer et al. | |
| 2013/0066823 A1 | 3/2013 | Sweeney et al. | |
| 2013/0097580 A1 | 4/2013 | Meijer et al. | |
| 2013/0159999 A1 | 6/2013 | Chiueh et al. | |
| 2013/0174127 A1 | 7/2013 | Chen et al. | |
| 2013/0211905 A1 | 8/2013 | Qin et al. | |
| 2013/0212285 A1 | 8/2013 | Hoffmann et al. | |
| 2013/0218547 A1 | 8/2013 | Ostermeyer et al. | |
| 2014/0006580 A1 | 1/2014 | Raghu | |
| 2014/0013315 A1 | 1/2014 | Genevski et al. | |
| 2014/0052712 A1 | 2/2014 | Savage et al. | |
| 2014/0079297 A1 | 3/2014 | Tadayon et al. | |
| 2014/0089901 A1 | 3/2014 | Hadar | |
| 2014/0092722 A1 | 4/2014 | Jain et al. | |
| 2014/0108647 A1 | 4/2014 | Bleess et al. | |
| 2014/0115164 A1 | 4/2014 | Kalyanaraman et al. | |
| 2014/0165054 A1 | 6/2014 | Wang et al. | |
| 2014/0165063 A1 | 6/2014 | Shiva et al. | |
| 2014/0258872 A1 | 9/2014 | Spracklen et al. | |
| 2014/0269691 A1 | 9/2014 | Xue et al. | |
| 2014/0304407 A1 | 10/2014 | Moon | |
| 2014/0310813 A1 | 10/2014 | Murthy | |
| 2014/0317261 A1 | 10/2014 | Shatzkamer et al. | |
| 2014/0317293 A1 | 10/2014 | Shatzkamer | |
| 2014/0350888 A1 | 11/2014 | Gesmann | |
| 2014/0372230 A1 | 12/2014 | Ray et al. | |
| 2015/0032437 A1 | 1/2015 | Kumar et al. | |
| 2015/0046212 A1 | 2/2015 | Mos | |
| 2015/0052250 A1 | 2/2015 | Doganata et al. | |
| 2015/0089483 A1* | 3/2015 | Guthridge | G06F 8/433 |
| | | | 717/140 |
| 2015/0127415 A1 | 5/2015 | Showalter et al. | |
| 2015/0127815 A1 | 5/2015 | Billore et al. | |
| 2015/0134589 A1 | 5/2015 | Marrelli et al. | |
| 2015/0142457 A1 | 5/2015 | Marshall | |
| 2015/0358391 A1 | 12/2015 | Moon et al. | |
| 2016/0035114 A1 | 2/2016 | Hesse et al. | |
| 2016/0042296 A1 | 2/2016 | Shan et al. | |

OTHER PUBLICATIONS

U.S. Appl. No. 13/658,709, Wang et al.
U.S. Appl. No. 13/658,724, Wang et al.
U.S. Appl. No. 14/725,778, Chen et al.
U.S. Appl. No. 14/607,776, Qin et al.
U.S. Appl. No. 14/607,907, Qin et al.
U.S. App. No. 14/858,341, Qin et al.
Template Software, Workflow Template Process Template, "Developing a WFT Workflow System", 1997, whole manual.
Partridge C. et al. FIRE State Message Protocol Specification, BBN Technologies, Jul. 12, 2000, (pp. 1-19).
Newrelicblog, "Platform as a Service Meets SaaS Application Performance Management"; http://blog.newrelic.com/2011/01/13/platform-as-a-service-meets-saas-application-performance-management/; Jan. 13, 2011; 3 pages.
Quest Software, Inc.; "Instance Monitor"; Brochure, Quest Software, Inc.; 1999; 2 pages.
Boucher, Karen et al.; "Essential Guide to Object Monitors"; Mar. 1999; 263 pages (whole book).
Dewan, Prasun et al.; "A High-Level and Flexible Framework for Implementing Multiuser User Interfaces"; 1992; pp. 345-380.
Distributed Management Task Force, Inc. (DMTF); "Common Information Model (CIM) Infrastructure Specification"; Version 2.3 Final; Oct. 4, 2005; 102 pages.
Harrison, Guy; "Oracle SQL High-Performance Tuning"; ("Building a High-Performance Oracle Database Server" and "Tuning the Database Server"); Prentice-Hall, NJ; 1997; pp. 363-364 and 399-400.
Hitachi, Ltd et al.; "Hitachi TPBroker User's Guide: Release 3.1"; Sep. 28, 1998; 311 pages (entire manual).
Laessig, Dirk; "Score Big with JSR 77, the J2EE Management Specification"; Javaworld; Jun. 14,2002; 8 pages.
Muller, Nathan J.; "Focus on HP OpenView: A Guide to Hewlett-Packard's Network and Systems Management Platform"; CBM Books; 1995; 304 pages (entire book).
Savant Corporation; "Products"; http://www.savant-corp.com/prods.html, downloaded on Nov. 16, 1999; 1 page.
Savant Corporation; "Products"; http://www.savant-corp.com/prods.html, downloaded on Feb. 15, 2000; 1 page.
Savant Corporation; "Q Application Diagnostics"; http://www.savant-corp.com/qappd.html, downloaded on Nov. 16, 1999; 1 page.
Savant Corporation; "Q Hot SQL"; http://www.savant-corp.com/qhsql.html, downloaded on Nov. 16, 1999; 1 page.
Savant Corporation; "Q Instance Overview"; http://www.savant-corp.com/qiov.html, downloaded on Nov. 16, 1999; 1 page.
Savant Corporation; "Q Job Queue Manager"; http://www.savant-corp.com/qjobq.html, downloaded on Nov. 16, 1999; 1 page.

(56) References Cited

OTHER PUBLICATIONS

Savant Corporation; "Q Lock Manager"; http://www.savant-corp.com/qlock.html, downloaded on Nov. 16, 1999; 1 page.
Savant Corporation; "Q Replay Viewer"; http://www.savant-corp.com/qreplay.html, downloaded on Nov. 16, 1999; 1 page.
Singh, Inderjeet et al.; "Designing Web Services with J2EE 1.4 Platform JAX-RPC, SOAP, and XML Technologies"; Chapter 6 (pp. 247-289); May 2004; 46 pages.
Tang, Steven H. et al.; "Blending Structured Graphics and Layout"; ACM; Nov. 1994; pp. 167-174.
Wikimedia Foundation, Inc.; "Network Functions Virtualization"; http://en.wikipedia.org/wiki/Network_Functions_Virtualization; last modified Mar. 17, 2015; 6 pages.
NEO4J; "Network Dependency Graph"; http://www.neo4j.org/graphgist?github-neo4J . . . ; Jun. 18, 2014; 9 pages.
BMC Software, Inc.; "BMC Atrium Discovery and Dependency Mapping"; http://documents.bmc.com/products/documents/18/60/451860/451860.pdf ; 2014; 2 pages.
Grisby, Duncan; "The Power behind BMC Atrium Discovery and Dependency Mapping"; http://documents.bmc.com/products/documents/18/97/451897/451897.pdf; 2014; 5 pages.
Hewlett-Packard Development Company, L.P.; "Data Sheet: HP Universal Discovery Software"; http://h20195.www2.hp.com/V2/GetPDF.aspx/4AA4-1812ENW.pdf; Sep. 2014; 8 pages.
Quest Software, Inc.; "Foglight 5.6.4: Managing Dependency Mapping User Guide"; 2012; 62 pages.
Quest Software, Inc.; "Foglight 5.6.2: Managing the Dependency Mapping User Guide"; 2011; 55 pages.
Quest Software, Inc.; "Foglight APM: An Adaptive Architecture for All Environments"; 2011; 25 pages.
VFoglight Alarms: Overview—Demo 6; 2009; 31 pages.
Quest Software, Inc.; "Foglight 5.5.8: Managing Dependency Mapping User Guide"; 2011; 53 pages.
Cappelli, Will; "APM Needs Three-Layered Application Materials"; Gartner Research; Feb. 26, 2010; 5 pages.
Microsoft; "What is System Center Advisor?"; http://onlinehelp.microsoft.com/en-us/advisor/ff962512(printer).aspx; accessed on Apr. 5, 2011; 2 pages.
Microsoft; "Microsoft System Center Advisor"; https://www.systemcenteradvisor.com/; accessed on Apr. 4, 2011; 1 page.
Microsoft; "Windows Management Instrumentation (WMI): Frequently Asked Questions: Troubleshooting and Tips"; http://technet.microsoft.com/en-us/library/ee692772(d=printer).aspx; Microsoft TechNet; Jul. 28, 2004; 20 pages.
Maston, Michael; "Managing Windows with WMI"; http://technet.microsoft.com/en-us/library/bb742445(d=printer).aspx; Nov. 1, 1999; 11 pages.
Aternity, Inc., "Aternity Virtual Desktop Monitoring: Get Visibility into all Tiers of the Virtual Desktop," http://www.aternity.com/products/workforce-apm/virtual-desktop-monitoring/, May 11, 2014, 2 pages.
Solarwinds Worldwide. LLC., "SolarWinds: Virtualization Manager Administrator Guide," DocVersion 6.3.0.1, Sep. 8, 2015, 321 pages.
Eg Innovations, Inc., "eG Enterprise Performance Monitoring for Citrix XenDesktop: Performance Assurance for Citrix Virtual Desktops," www.eginnovations.com, accessed on Sep. 17, 2015, 2 pages.
Eg Innovations, Inc., "Service Overview: VDI Performance Assessment: Move VDI Deployments from Test to Best," www.eginnovations.com, accessed on Sep. 17, 2015, 2 pages.
Eg Innovations, Inc., "Total Performance Monitoring for Citrix XenApp and XenDesktop," www.eginnovations.com, accessed on Sep. 17, 2015, 2 pages.
Goliath Technologies, "Goliath Performance Monitor: for Citrix XenApp & XenDesktop," http://goliathtechnologies.com, May 2014, 2 pages.
Goliath Technologies, "Goliath Performance Monitor: for VMware," http://goliathtechnologies.com, May 2014, 2 pages.
VMTurbo, "VDI Control Module," http://vmturbo.com, Nov. 2014, 2 pages.
VMTurbo, "VMTurbo Operations Manager: Demand-Driven Control for Cloud and Virtualization," http://vmturbo.com, Jun. 2015, 2 pages.
U.S. Appl. No. 14/562,474, Rustad et al.
U.S. Appl. No. 14/249,147, Rustad et al.
U.S. Appl. No. 14/292,135, Rustad.
Layered Technologies, Inc., "Optimized Application Performance and User Experience: Application Performance Management Service," 2013, 4 pages.
Levey, Tom, "Monitoring the Real End User Experience," www.appdynamics.com, Jul. 25, 2013, 7 pages.
Quarles, John et al.; "A Mixed Reality Approach for Merging Abstract and Concrete Knowledge"; IEEE Virtual Reality 2008; Mar. 8-12, 2008; pp. 27-34.
U.S. Appl. No. 15/201,655, Qin et al.
U.S. Appl. No. 15/,201,657, Qin et al.
Wood, Timothy, et al.; Middleware 2008; "Profiling and Modeling Resource Usage of Virtualized Applications"; vol. 5346 of the series Lecture Notes in Computer Science; Dec. 2008; pp. 366-387.
Liquidware Labs; "Performance Validation and Optimization"; http://www.liquidwarelabs.com/products/stratusphere-ux/performance-validation-optimization; Oct. 1, 2015; 2 pages.
Dell, Inc.; "Monitoring with User Dashboards"; vWorkspace Monitoring and Diagnostics 5.5.5—User's Guide; http://documents.software.dell.com/vworkspace-monitoring-and-diagnostics/5.6.5/users-guide/users-guide/working-with-foglight-for-virtual-desktops/monitoring-with-user-dashboards?ParentProduct=687; last revised on May 23, 2013; 4 pages.
Agrawal, Banit, et al.; "VMware View® Planner: Measuring True Virtual Desktop Experience at Scale"; VMWare Technical Journal (VMTJ), Winter 2012; Dec. 2012; pp. 69-79.
Spracklen, Lawrence, et al.; "Comprehensive User Experience Monitoring"; VMWare Technical Journal (VMTJ), Spring 2012; Mar. 2012; pp. 22-31.

\* cited by examiner

| | | | | | | | |
|---|---|---|---|---|---|---|---|
| ⊞ ⊚POST/physician-web/physician/viewPatients.action | HTTP | n/a | 6,416 | 1.174 | 0.000 | 0.000 | 0.000 | 0.000 | 0.000 |
| ⊞ ○AuthorizationFilter.doFilter(ServletRequest, ServletResponse, FilterChain) | Servlet | AuthorizationFilter | 1 | 1.780 | 1.780 | 1.780 | 0.101 | 0.189 | 0.189 |
| ○Context.lookup(String) | JNDI | n/a | 2 | 0.000 | 0.000 | 0.000 | 0.000 | 0.000 | 0.000 |
| ○Context.close() | JNDI | n/a | 6 | 0.000 | 0.000 | 0.000 | 0.000 | 0.000 | 0.000 |
| ⊞ ○ViewingRecordSummaryController.getRecordSummary() | Java Method | n/a | 6 | 0.000 | 0.000 | 0.000 | 0.000 | 0.000 | 0.000 |
| ⊞ ○PageContextImpl.getSessionMap() | Java Method | n/a | 6 | 0.000 | 0.000 | 0.000 | 0.000 | 0.000 | 0.000 |
| ○PageContextImpl.getFacesContext() | Java Method | n/a | 6 | 0.000 | 0.000 | 0.000 | 0.000 | 0.000 | 0.000 |
| ⊞ ○ViewingRecordSummaryController.setPatientMiddleName(String) | Java Method | n/a | 1 | 0.000 | 0.000 | 0.000 | 0.000 | 0.000 | 0.000 |
| ⊞ ○PersonName.setMiddleName(String) | Java Method | n/a | 1 | 0.000 | 0.000 | 0.000 | 0.000 | 0.000 | 0.000 |
| ⊞ ○PersonName._persistence_set_middleName(String) | Java Method | n/a | 1 | 0.000 | 0.000 | 0.000 | 0.000 | 0.000 | 0.000 |
| ○PersonName._persistence_propertyChange(String, Object, Object) | Java Method | n/a | 1 | 0.000 | 0.000 | 0.000 | 0.000 | 0.000 | 0.000 |
| ⊞ ○StringUtils.isNotEmpty(String) | Java Method | n/a | 1 | 0.000 | 0.000 | 0.000 | 0.000 | 0.000 | 0.000 |
| ○StringUtils.isEmpty(String) | Java Method | n/a | 1 | 0.000 | 0.000 | 0.000 | 0.000 | 0.000 | 0.000 |
| ○Context.lookup(String) | JNDI | n/a | 2 | 0.000 | 0.000 | 0.000 | 0.000 | 0.000 | 0.000 |
| ○Context.close() | JNDI | n/a | 2 | 0.000 | 0.000 | 0.000 | 0.000 | 0.000 | 0.000 |
| ⊞ ○ViewingRecordSummaryController.setPatientLastName(String) | Java Method | n/a | 1 | 0.000 | 0.000 | 0.000 | 0.000 | 0.000 | 0.000 |
| ⊞ ○PersonName.setLastName(String) | Java Method | n/a | 1 | 0.000 | 0.000 | 0.000 | 0.000 | 0.000 | 0.000 |
| ⊞ ○PersonName._persistence_set_lastName(String) | Java Method | n/a | 1 | 0.000 | 0.000 | 0.000 | 0.000 | 0.000 | 0.000 |
| ○PersonName._persistence_propertyChange(String, Object, Object) | Java Method | n/a | 1 | 0.000 | 0.000 | 0.000 | 0.000 | 0.000 | 0.000 |
| ⊞ ○StringUtils.isNotEmpty(String) | Java Method | n/a | 1 | 0.000 | 0.000 | 0.000 | 0.000 | 0.000 | 0.000 |
| ○StringUtils.isEmpty(String) | Java Method | n/a | 1 | 0.000 | 0.000 | 0.000 | 0.000 | 0.000 | 0.000 |
| ⊞ ○ViewingRecordSummaryController.ViewingRecordSummaryController() | Java Method | n/a | 1 | 0.000 | 0.000 | 0.000 | 0.000 | 0.000 | 0.000 |
| ⊞ ○FoundPatient.FoundPatient() | Java Method | n/a | 1 | 0.000 | 0.000 | 0.000 | 0.000 | 0.000 | 0.000 |
| ○TransferObject.TransferObject() | Java Method | n/a | 1 | 0.000 | 0.000 | 0.000 | 0.000 | 0.000 | 0.000 |
| ⊞ ○BasePhysicianPageController.BasePhysicianPageController() | Java Method | n/a | 1 | 0.000 | 0.000 | 0.000 | 0.000 | 0.000 | 0.000 |
| ⊞ ○PageControllerSupport.PageControllerSupport() | Java Method | n/a | 1 | 0.000 | 0.000 | 0.000 | 0.000 | 0.000 | 0.000 |
| ○PageContextImpl.PageContextImpl() | Java Method | n/a | 1 | 0.000 | 0.000 | 0.000 | 0.000 | 0.000 | 0.000 |
| ⊞ ○PersonName.PersonName() | Java Method | n/a | 1 | 0.000 | 0.000 | 0.000 | 0.000 | 0.000 | 0.000 |
| ○DomainModel.DomainModel() | Java Method | n/a | 1 | 0.000 | 0.000 | 0.000 | 0.000 | 0.000 | 0.000 |
| ⊞ ○PageContextImpl.getSessionMap() | Java Method | n/a | 1 | 0.000 | 0.000 | 0.000 | 0.000 | 0.000 | 0.000 |
| ○PageContextImpl.getFacesContext() | Java Method | n/a | 1 | 0.002 | 0.002 | 0.002 | 0.002 | 0.000 | 0.000 |
| ⊞ ○_viewrecordsummary._jspService(HttpServletRequest, HttpServletResponse) | Servlet | /physician/viewRe... | 1 | 0.000 | 0.000 | 0.000 | 0.000 | 0.000 | 0.000 |

SYSTEMS AND METHODS FOR GRAPHICALLY FILTERING CODE CALL TREES

BACKGROUND

Technical Field

The present disclosure relates generally to data analysis and more particularly, but not by way of limitation, to systems and methods for graphical filtering code call trees.

History of Related Art

Modern web applications process millions of transactions per day and can include multiple redundant layers. When a problem occurs, it can be difficult to trace the problem to a cause. Typical reports and alerts regarding transactions are complex and do not adequately indicate a root cause of poor-performing transactions.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In an embodiment, a method is performed by a computer system. The method includes accessing a call tree for a transaction, wherein the call tree traces routines called during execution of the transaction. The method further includes generating a graphical representation of the call tree in relation to two or more performance properties. In addition, the method includes causing the graphical representation of the call tree to be displayed. Further, the method includes allowing a user to graphically select a group of routines from the graphical representation of the call tree. In addition, the method includes creating a filtered call tree comprising the graphically selected group of routines. Furthermore, the method includes generating a drill-down visualization of the filtered call tree. The method also includes causing the drill-down visualization to be displayed.

In an embodiment, an information handling system includes at least one processor, wherein the at least one processor is operable to implement a method. The method includes accessing a call tree for a transaction, wherein the call tree traces routines called during execution of the transaction. The method further includes generating a graphical representation of the call tree in relation to two or more performance properties. In addition, the method includes causing the graphical representation of the call tree to be displayed. Further, the method includes allowing a user to graphically select a group of routines from the graphical representation of the call tree. In addition, the method includes creating a filtered call tree comprising the graphically selected group of routines. Furthermore, the method includes generating a drill-down visualization of the filtered call tree. The method also includes causing the drill-down visualization to be displayed.

In an embodiment, a computer-program product includes a non-transitory computer-usable medium having computer-readable program code embodied therein to implement a method. The method includes accessing a call tree for a transaction, wherein the call tree traces routines called during execution of the transaction. The method further includes generating a graphical representation of the call tree in relation to two or more performance properties. In addition, the method includes causing the graphical representation of the call tree to be displayed. Further, the method includes allowing a user to graphically select a group of routines from the graphical representation of the call tree. In addition, the method includes creating a filtered call tree comprising the graphically selected group of routines. Furthermore, the method includes generating a drill-down visualization of the filtered call tree. The method also includes causing the drill-down visualization to be displayed.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIGS. 4A-B and 5-7 illustrate an example of applying a process similar to the process of FIG. 3.

DETAILED DESCRIPTION

In various embodiments, a performance-monitoring system can track and trace end-user (EU) transactions. The performance-monitoring system can produce and store, for example, an end-to-end (E2E) response time for each EU transaction. An EU transaction, as used herein, is initiated by an EU request such as, for example, a web request, includes subsequent processing of the request by a backend-computing system, and is concluded by a web response from the backend-computing system. EU transactions can cross multiple nodes such as, for example, a web browser, a web server, an application server, a database, one or more external services, etc. Additionally, EU transactions can include execution of numerous routines by a distributed software application. Thus, an E2E response time can include, for example, a time elapsed from initiation through conclusion of an EU transaction.

One way to troubleshoot slow transaction performance is to analyze a code call tree. In general, each node in a code call tree corresponds to a particular routine of a software application. As used herein, the term "routine," in addition to having its broad ordinary meaning, can include procedural routines, object-oriented routines, functions, methods, components, modules, combinations of the same, and/or the like. Each node in a call tree can have a number of performance properties such as, for example, an exclusive execution time, number of calls to the routine, a corresponding application name, a corresponding package name, a corresponding class name, combinations of same, and/or the like. Although code call trees can include an extensive amount of information usable for troubleshooting, their size and complexity can impede effective analysis. For example, code call trees may include many thousands of lines.

One way to address the size and complexity of a code call tree is to produce a top-N list. The top-N list can include information related to most important routines, most-called routines, top routines by exclusive execution time, combinations of same, and/or the like. The size and complexity of the code call tree can also be addressed by filtering the code call tree by a single variable such as, for example, a start time range, exclusive execution time, etc. However, in general, using this approach, users would be unaware of relationships between data contained in the code call tree. Approaches such as top-N lists and single-variable filtering could also result in important data being excluded, vast amounts of unimportant data obfuscating true trouble spots, etc.

The present disclosure describes examples of graphically filtering a code call tree. In certain embodiments, a graphical representation of the code call tree can be generated and displayed to a user. In various cases, the user can be allowed to view the graphical representation and, based thereon, graphically select a group of one or more routines of the call tree. For example, in some implementations, the user can draw a box around the group of routines using a mouse, tablet, or touch screen. In certain embodiments, a filtered call tree can be created based, at least in part, on the user's graphical selection. The filtered call tree can be used to generate a drill-down visualization that provides a zoomed-in view of the graphically selected group of routines (e.g., a graph that includes a higher level of granularity relative to the graphically selected group of routines).

Advantageously, in certain embodiments, graphical selection of groups of routines as described herein can enable users to more adeptly and efficiently attain access to information about computer performance. For example, the generated graphical representations described herein, in conjunction with the graphical selection enabled herein, can expose relationships between routines, performance properties, and other factors. In this fashion, routines causing poor computing performance can be more efficiently identified.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
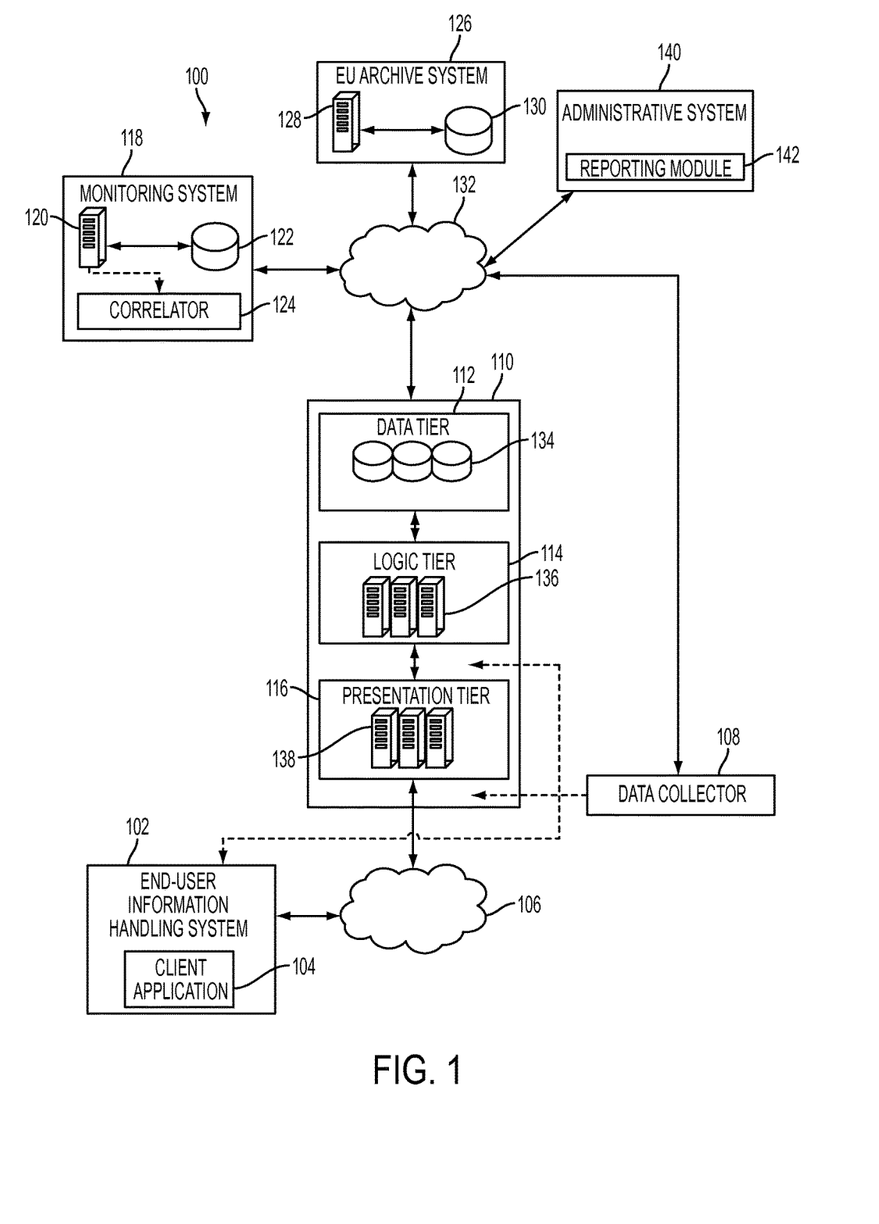
FIG. 1 illustrates a system for generating and performing analysis of end-to-end response times.

FIG. 1 illustrates an example of a system 100 for generating and performing analysis of code call trees. The system 100 includes at least one EU information handling system 102 communicating with a backend-computing system 110 over a network 106. The at least one EU information handling system 102 has a client application 104 such as, for example, a web-browser application, resident and executing thereon. The network 106 may include, for example, a public intranet, a private intranet, and/or the Internet. The system 100 further includes a monitoring system 118, an EU archive system 126, and an administrative system 140. The backend-computing system 110, the monitoring system 118, and the EU archive system 126 are operable to communicate over a network 132. Like the network 106, the network 132 may be representative, for example, of a public or private intranet or the Internet. In addition, the system 100 includes a data collector 108.

For illustrative purposes, the backend-computing system 110 is shown to utilize a three-tier architecture that includes a presentation tier 116, a logic tier 114, and a data tier 112. The presentation tier 116 includes at least one information server 138 such as, for example, a web server, that serves content to be rendered by the client application 104. The logic tier 114 includes at least one application server 136 that operates a platform based on, for example, Java EE, ASP-.NET, PHP, ColdFusion, Perl, and/or the like. The data tier 112 includes at least one database 134 that further includes, for example, data sets and a database management system that manages and provides access to the data sets.

It should be appreciated that, in various embodiments, the backend-computing system 110 may include any number of tiers. In addition, in various embodiments, the backend-computing system 110 may implement various alternative architectures such as, for example, a model-view-controller architecture. It should also be appreciated that the at least one application server 136 and the at least one information server 138 are shown separately in FIG. 1 only for purposes of illustrating logically-related functionality. In various embodiments, the at least one application server 136 and the at least one information server 138 are combined into a single server that functions as web server and application server.

The backend-computing system 110 executes one or more distributed software applications such as, for example, a web application, from which backend-performance data is collected. Backend-performance data, as used herein, refers to data collected during runtime of a software application such as, for example, a web application, through instrumentation of the software application. In a typical embodiment, the one or more distributed software applications have been instrumented to provide the backend-performance data. Each of the one or more distributed software applications may be, for example, a collection of software components or services that make up an application stack. In various embodiments, the backend-computing system 110 may use an agent resident thereon to collect the backend-performance data.

The backend-performance data can include, for example, metrics related to infrastructure components (virtual or physical) such as, for example, the at least one database 134, the at least one application server 136, and the at least information server 138. The backend-performance data can also include metrics related to each routine of a software application that is executed. The backend-performance data can further include aggregated metrics related to infrastructure tiers such as, for example, the presentation tier 116, the logic tier 114, and the data tier 112. In addition, the backend-performance data can include metrics related to the application stack for each of the one or more distributed software applications. In a typical embodiment, the backend-performance data can trace EU transactions through a topology of nodes that can include, for example, infrastructure components, infrastructure tiers, and/or application-stack components as described above. Metrics can include, for example, execution time at each tier or by each component or node. Examples of how backend-performance data can collected and managed is described in detail in U.S. Pat. No. 7,979,245 and U.S. Pat. No. 8,175,863, each of which is hereby incorporated by reference.

More particularly, the backend-performance data can include information related to each routine of a software application that is executed on the backend-computing system 110 in connection with an E2E transaction. For example, the backend-performance data can trace the execution of the software application through each routine thereof to yield, for example, information related to execution times, a number of exceptions, a number of incomplete executions, a total number of calls to the routine during the E2E transaction, combinations of same, and/or the like. The information related to execution times can include an exclusive execution time, a total execution time, etc. In particular embodiments, the exclusive execution time can include time spent executing a particular routine, excluding time spent executing child routines called by the particular routine. In particular embodiments, the total execution time can include time spent executing the particular routine, inclusive of time spent executing child routines called by the particular routine. In various cases, the backend-performance data can be supplemented with statistical data related to any of the foregoing such as totals, averages, minimums, maximums, combinations of same, and/or the like. Also, in certain embodiments, the backend performance data can further include other performance properties such as a name of each routine, a type of the routine, etc.

The data collector 108 is a software component that collects EU-experience data for the at least one EU information handling system 102. EU-experience data, as used herein, refers to data collected through observation of one or more transactions from an EU perspective. In a typical embodiment, the data collector 108 is situated in the system 100 such that the data collector 108 is capable of seeing all network traffic (i.e., all packets exchanged) between the at least one EU information handling system 102 and the backend-computing system 110. In this fashion, the data collector 108 functions as a packet analyzer and is operable to extract the EU-experience data and transmit the EU-experience data to the EU archive system 126. The EU archive system 126 includes at least one server computer 128 and at least one database 130. The EU archive system 126 receives the EU-experience data from the data collector 108 and stores the EU-experience data in the at least one database 130. An example of how EU-experience data can be collected is described in U.S. Pat. No. 7,941,385. U.S. Pat. No. 7,941,385 is hereby incorporated by reference.

As illustrated, the data collector 108 can reside at various nodes in the system 100. For example, the data collector 108 can reside on the backend-computing system 110 between the presentation tier 116 and the logic tier 114. The data collector 108 can also be resident on the backend-computing system 110 between the presentation tier 116 and the network 106. In addition, in various embodiments, the data collector 108 is representative of client-side scripting that is executed on the at least one EU information handling system 102. In this fashion, the data collector 108 can also be resident on the at least one EU information handling system 102. It should be appreciated that other locations for the data collector 108 such as, for example, within the presentation tier 116, are also contemplated.

The monitoring system 118 includes at least one server computer 120 and at least one database 122. The at least one server computer 120 is operable to execute a correlator 124. The correlator 124 is typically a software component that correlates the EU-experience data maintained by the EU archive system 126 with the backend-performance data maintained by the monitoring system 118 to yield E2E response times for EU transactions. In many cases, the monitoring system 118, the at least one server computer 120, and/or the at least one database 122 can be or be implemented on information handling systems. Example operation of the system 100 will be described with respect to FIG. 2.

The administrative system 140 includes a reporting module 142. The administrative system 140 can include any number of server computers and/or databases. The reporting module 142 can include hardware and/or software for generating and/or presenting alerts, reports, and/or the like based on data stored or generated by the monitoring system 118 and the EU archive system 126. The reports and/or alerts can be served to an administrative user using, for example, an information handling system similar to the EU information handling system 102. For example, in certain embodiments, the reporting module 142 can facilitate graphical filtering of a code tree as described with respect to FIGS. 3-7.

One of ordinary skill in the art will appreciate that each instance of a computer or computer system as described above may be representative of any number of physical or virtual server computers. Likewise, each instance of a database may be representative of a plurality of databases. In addition, it should be appreciated that, in various embodiments, each instance of a network such as, for example, the network 106 or the network 132, can be viewed as an abstraction of multiple distinct networks. For example, the network 106 and the network 132 can each include one or multiple communications networks such as, for example, public or private intranets, a public switch telephone network (PSTN), a cellular network, the Internet, or the like. In addition, in various embodiments, the network 106 and the network 132 may overlap or refer to a same network.

Figure 2:
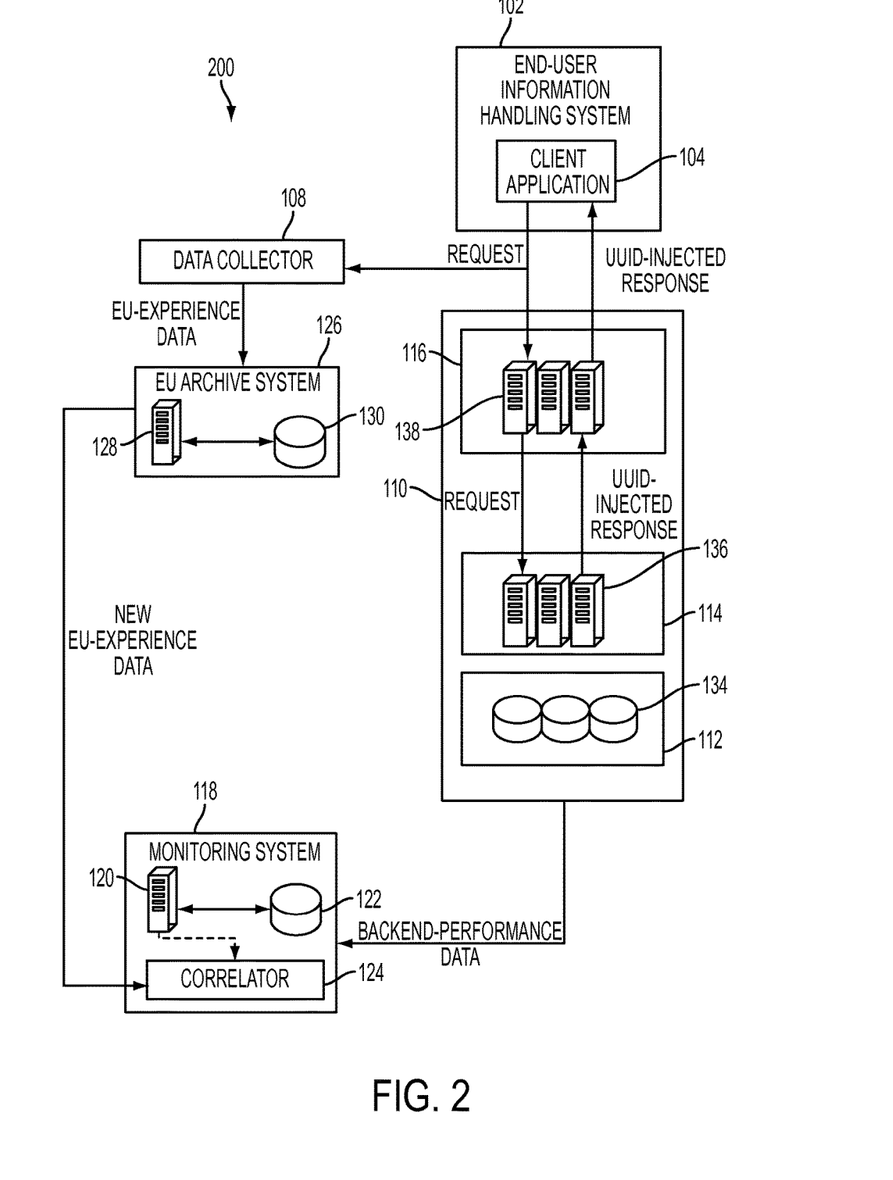
FIG. 2 illustrates an example data flow using the system of FIG. 1.

FIG. 2 illustrates an example data flow 200 using the system 100 of FIG. 1. The EU information handling system 102 initiates a transaction by directing a request such as, for example, an HTTP request, to the at least one information server 138 of the presentation tier 116. The at least information server 138 forwards the request to an appropriate application server, i.e., the at least one application server 136, for handling. The at least one application server 136 generates an identifier (e.g., a UUID) for the transaction. In a typical embodiment, the backend-computing system 110 uses the identifier to identify backend-performance data collected during processing of the transaction, which data is stored by the monitoring system 118 as described above.

A monitoring agent on the at least one application server 136 injects the identifier in a response to the request (i.e., a UUID-injected response), which response is directed to the at least one EU information handling system 102 along a transmission path that includes that at least one information server 138 and the at least one EU information handling system 102. In this fashion, no modification of application code is required to inject the identifier. Rather, the monitoring agent, which is already being utilized for existing instrumentation of the distributed software application, injects the identifier into the response. The response may be a web response such as, for example, an HTTP response. In various embodiments, the identifier can be injected, for example, into a response header for the response. In some embodiments, the identifier may be inserted into a cookie that is sent as part of the response header. Content of the UUID-injected response is rendered on the at least one EU information handling system 102 via the client application 104.

As noted above, the data collector 108 is situated on the system 100 so that the data collector 108 can observe all network traffic exchanged between the backend-computing system 110 and the EU information handling system 102. Therefore, the data collector 108 is effectively a transparent node along the transmission path. The data collector 108 passively observes the UUID-injected response and uses the identifier to identify EU-experience data that is collected.

The correlator 124 is operable to extract EU-experience data not previously obtained by the correlator (i.e., new EU-experience data) from the EU archive system 126. In various embodiments, the correlator 124 may operate on a periodic basis, on-demand, or in real-time. The correlator 124 is operable to correlate the EU-experience data and the backend-performance data that relates to a same transaction (i.e., a same request and response) by cross-referencing identifiers. In this manner, data resulting from instrumentation (the backend-performance data) and the EU-experience data, which is typically collected without instrumentation, can be correlated. The correlated data can be stored in the at least one database 122. The correlated data can also be used to generate E2E response times for end-user transactions. In addition, on a periodic basis (e.g., every five minutes) or on demand, the correlator 124 may aggregate the correlated data into one or more high-level transaction categories such as, for example, log-in, search, or checkout. Therefore, problems with particular transaction categories can be readily identified and appropriate alerts generated.

Figure 3:
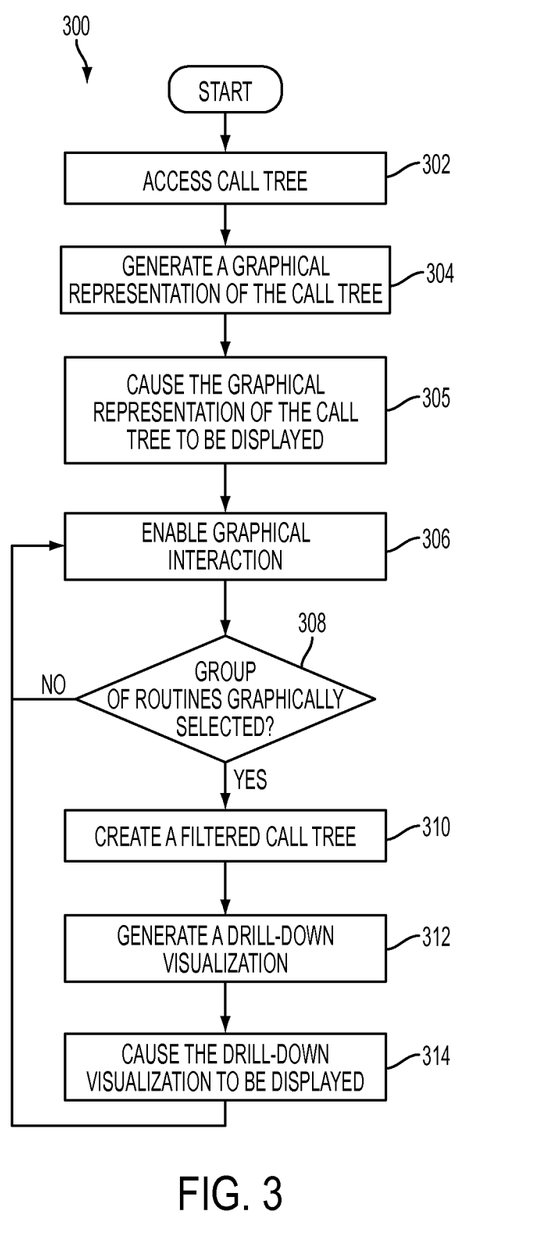
FIG. 3 illustrates an example of a process for graphically filtering a code call tree.

FIG. 3 illustrates an example of a process 300 for graphically filtering a code call tree. In various embodiments, the process 300 can be performed for an EU transaction selected by user or computer system, an aggregation of EU transactions, combinations of same, and/or the like. For simplicity of description, the process 300 will be described for a single EU transaction. For example, the process 300, in whole or in part, can be implemented by one or more of the monitoring system 118, the correlator 124, the EU archive system 126, the administrative system 140, the reporting module 142, and/or the EU information handling system 102. The process 300 can also be performed generally by the system 100. Although any number of systems, in whole or in part, can implement the process 300, to simplify discussion, the process 300 will be described in relation to specific systems or subsystems of the system 100.

At block 302, the reporting module 142 access a call tree for a transaction. As described above, the call tree generally traces routines that are called during the execution of the transaction. At block 304, the reporting module 142 generates a graphical representation of the call tree. The graphical representation can take various forms such as, for example, a graphical plot of the routines of the call tree in relation to two or more performance properties. For example, the graphical representation can illustrate a change in the two or more performance properties for each of the routines of the call tree.

At block 305, the reporting module causes the graphical representation to be displayed on an EU computing device. For example, the block 305 can include transmitting, publishing, or otherwise making the graphical representation available over a network such as the network 106 and/or the network 132. At block 306, the reporting module 142 enables a user to graphically interact with the graphical representation. For example, in various embodiments, the user can be allowed to draw a box around or otherwise graphically select a group of routines from the graphical representation of the call tree. At decision block 308, the reporting module 142 determines whether a group of routines has been graphically selected by the user. If not, the process 300 returns to block 306 and proceeds as described above. Otherwise, if it is determined at decision block 308 that a group of routines has been graphically selected by the user, the process 300 proceeds to block 310.

At block 310, the reporting module 142 creates a filtered call tree that includes the graphically selected group of routines. In some embodiments, the block 310 can include automatically identifying one or more additional routines based, at least in part, on an analysis of the graphically selected routines and of the call tree. For example, in certain embodiments, immediate parents and/or immediate children of each of the graphically selected group of routines can be automatically identified and included in the filtered call tree. In a typical embodiment, an immediate parent of a given routine is a routine from which the given routine is called. In a typical embodiment, an immediate child of a given routine is routine that is called within the given routine.

At block 312, the reporting module 142 generates a drill-down visualization of the filtered call tree. In general, the drill-down visualization can provide a zoomed-in view of the routines of the filtered call tree. For example, the drill-down visualization can provide additional information regarding one or more performance properties related to the routines of the filtered call tree.

At block 314, the reporting module 142 causes the drill-down visualization to be displayed. In certain embodiments, the block 314 can include functionality similar to that which is described above with respect to block 305. From block 314, the process 300 returns to block 306. In certain embodiments, the reporting module 142 allows multiple levels of granularity so that the user can continue, in effect, to zoom-in on routines of the call tree (and filtered versions thereof). In some embodiments, the user can generate one, two, three, four, or any other suitable number of drill-down visualizations. In certain embodiments, a predefined number (e.g., two) can be established such that once the predefined number of drill-down visualizations have been generated and displayed, the process 300 ends. The process 300 can also end when terminated by the user, an administrator, or if other suitable termination criteria is satisfied.

Figure 4B:
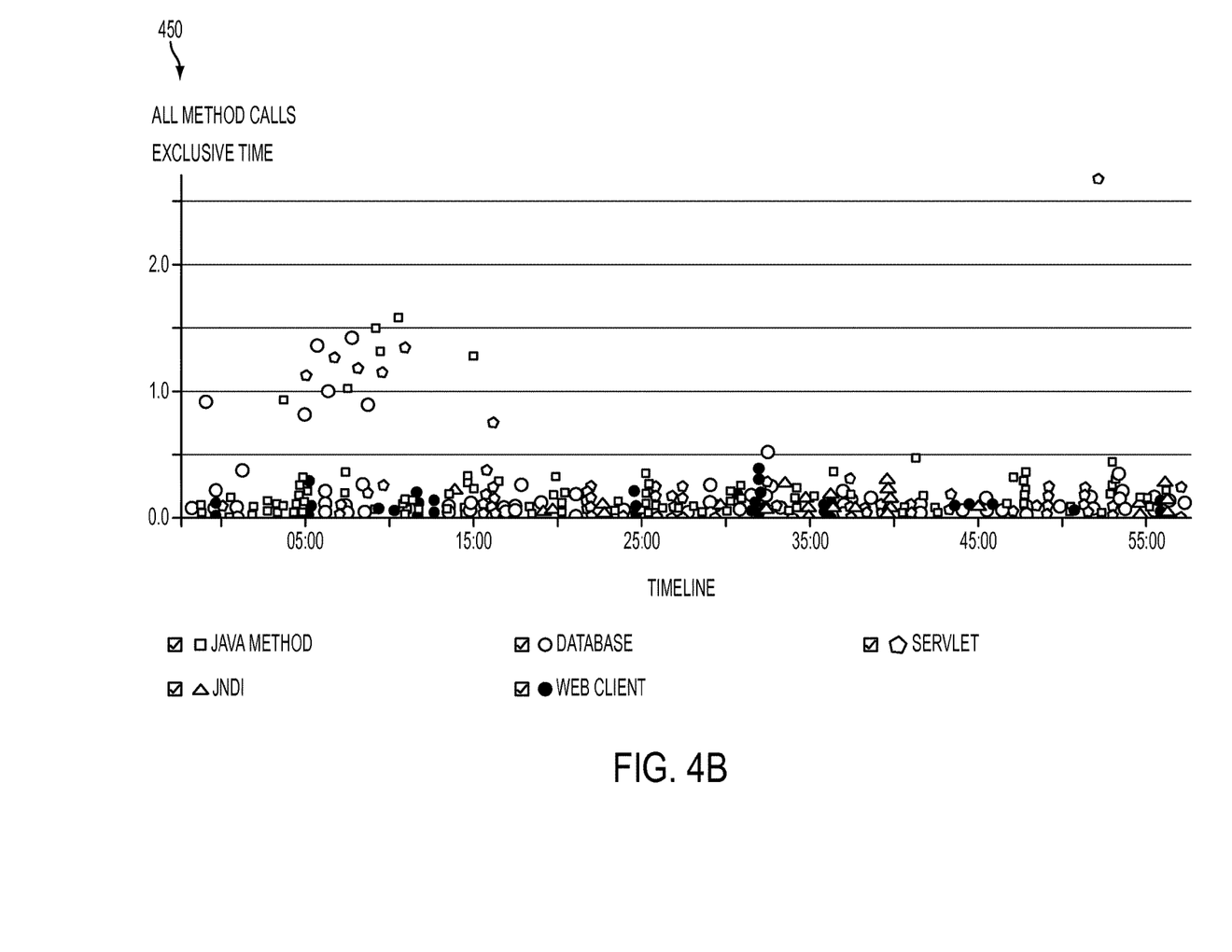

FIGS. 4A-B and 5-7 illustrate an example of applying a process similar to the process 300 of FIG. 3. In particular, FIG. 4A illustrates an example of a call tree 400 that can be accessed, for example, as described with respect to block 302 of FIG. 3. FIG. 4B illustrates an example of a graphical representation 450 of the call tree 400. In particular, the graphical representation 450 can be generated and caused to be displayed as described with respect to blocks 304 and 305, respectively, of FIG. 3.

More specifically, the graphical representation 450 is a graphical plot of the routines of the call tree 400 in relation to three performance properties. A y-axis of the graphical representation 450 illustrates an exclusive execution time of each of the routines of the call tree 400. An x-axis of the graphical representation 450 illustrates a point on an overall timeline for a transaction at which each of the plotted routines was called. The overall timeline can, in some cases, correspond to an E2E response time. In addition, a shading, color, shape or other indication relative to each of the plotted routines can indicate whether each plotted routine corresponds to a JAVA method, JAVA Naming and Directory Interface (JNDI), database, web client, servlet, combinations of same, and/or the like.

Figure 5:
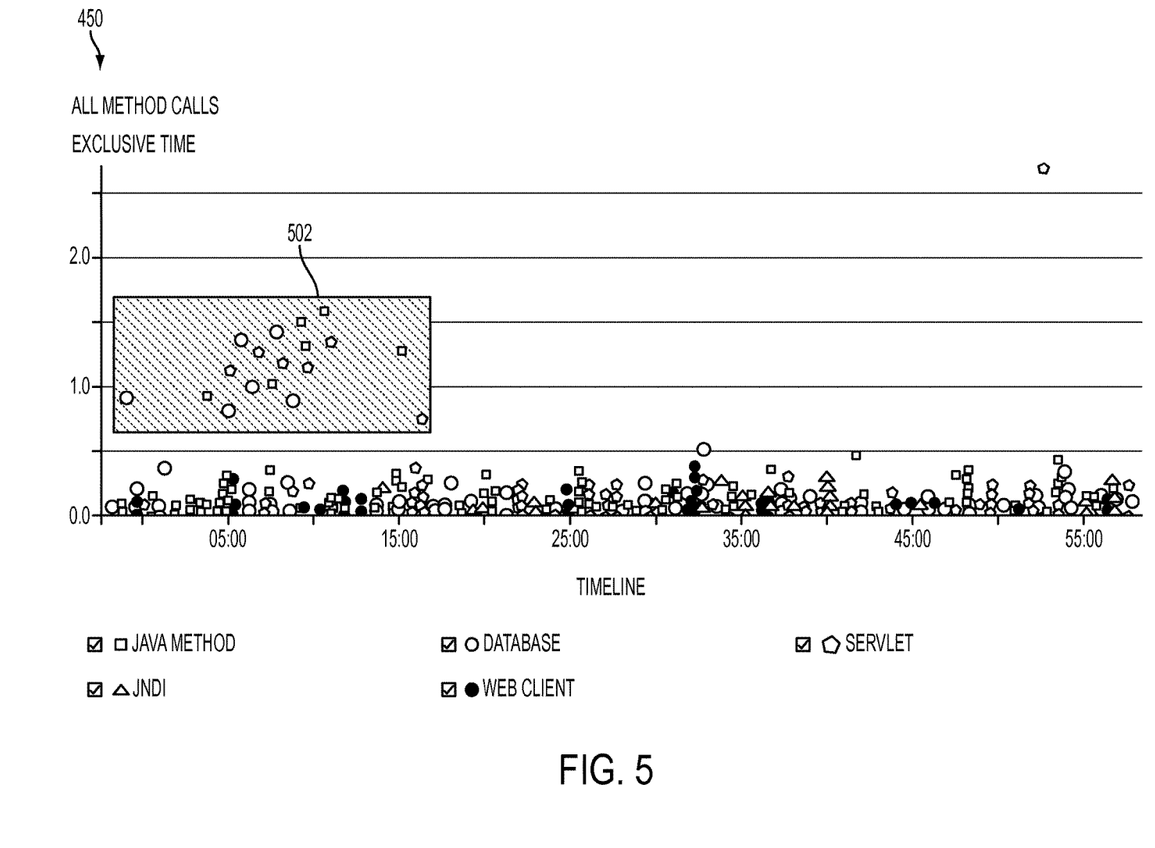

FIG. 5 illustrates an example of graphical interaction with the graphical representation 450 of FIG. 4B. In particular, as illustrated, the user has graphically selected a group of routines 502. For example, the graphically selected group of routines 502 can result from the block 306 of FIG. 3.

Figure 6:
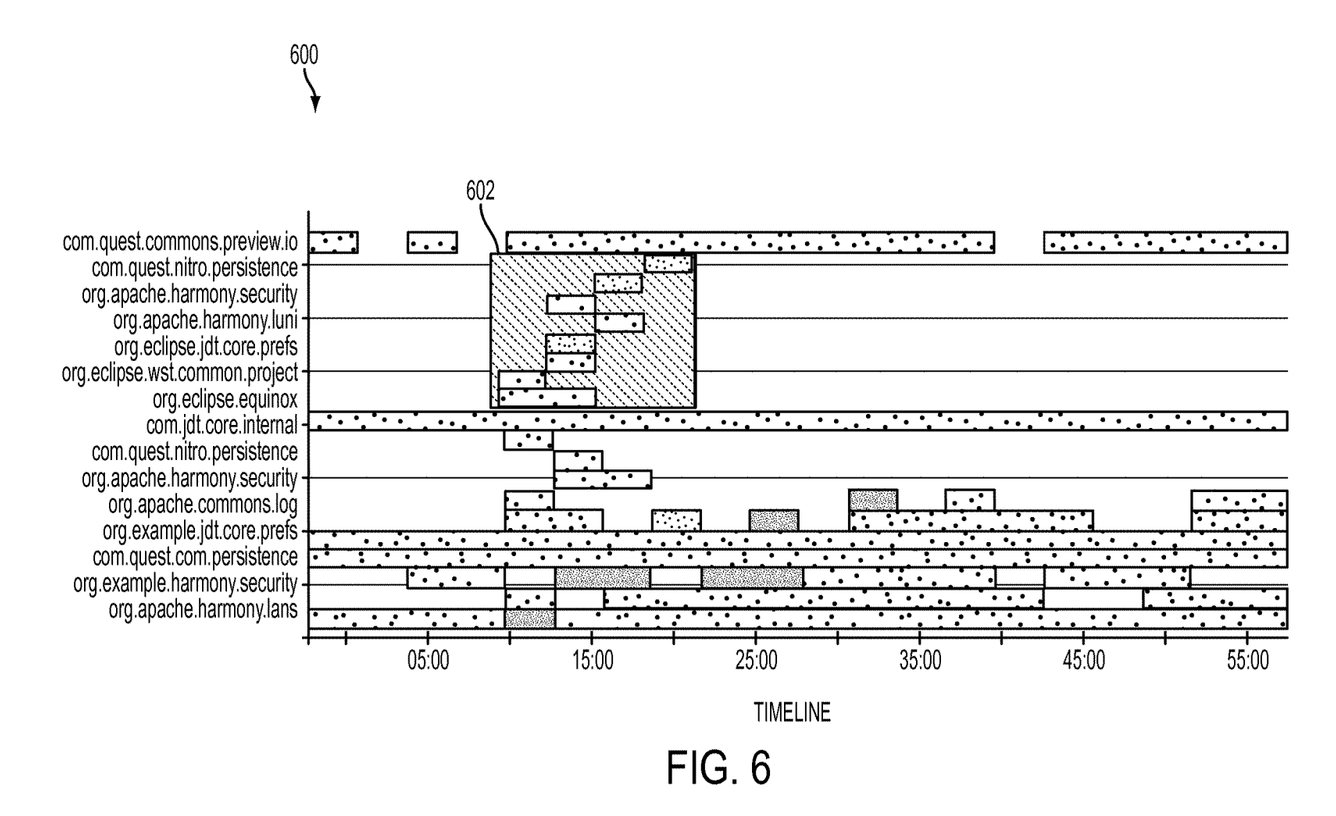

FIG. 6 illustrates an example of a drill-down visualization 600 that can result from the graphically selected group of routines 502. In various embodiments, the drill-down visualization 600 can be a visualization of a filtered call tree that is created, for example, as described with respect to block 310 of FIG. 3. The drill-down visualization 600 can be generated and caused to be displayed as described, for example, with respect to blocks 312 and 314, respectively, of FIG. 3.

More particularly, the drill-down visualization 600 is an example of a heat map of the filtered call tree. The routines of the filtered call tree are listed along an y-axis of the drill-down visualization 600. A transaction timeline is illustrated along a x-axis of the drill-down visualization 600. As shown, the drill-down visualization 600 graphically indicates a number of calls to each routine of the filtered call tree (e.g., via darker shading or denser stippling for greater numbers of calls), along with each routine's exclusive execution time relative to the transaction timeline (e.g., via a length of each horizontal bar). In addition, as described with respect to FIG. 3, in certain embodiments, multiple levels of drill-down visualization can be generated and displayed. For example, as illustrated in FIG. 6, a user has graphically selected a group of routines 602 for an additional drill-down visualization.

Figure 7:
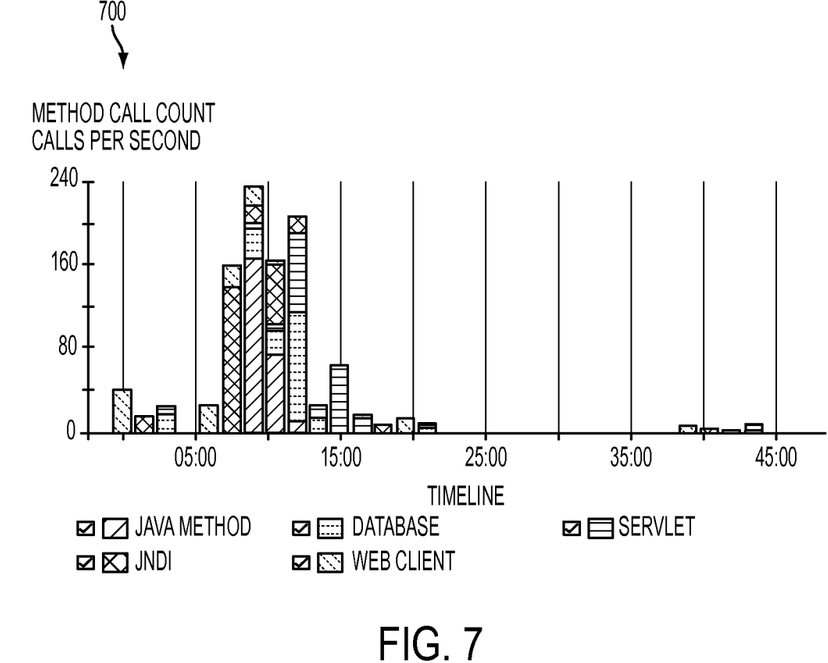

FIG. 7 illustrates an example of a drill-down visualization 700 that can result from the graphically selected group of routines 602 of FIG. 6. In various embodiments, the drill-down visualization 700 can be a visualization of another filtered call tree that is created, for example, during another iteration of the block 310 of FIG. 3. The drill-down visualization 700 can be generated and caused to be displayed as described, for example, with respect to blocks 312 and 314, respectively, of FIG. 3.

The drill-down visualization 700 is an example of a histogram that graphically indicates a distribution of routine-call counts for particular types of routines over particular intervals of the transaction timeline. More particularly, for each interval illustrated in the drill-down visualization 700, a vertical bar indicates a total number of routine calls per second over that interval for the graphically selected group of routines 602. A shading, color or other designation within each vertical bar can further indicate a proportion of the total number of routine calls per second (for that interval) that is attributable to particular categories of routines such as, for example, routines corresponding to a JAVA method, JAVA Naming and Directory Interface (JNDI), database, web client, servlet, combinations of same, and/or the like.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system:
accessing a code call tree for an end-user transaction, wherein the code call tree traces routines called during execution of the end-user transaction, wherein each node in the code call tree corresponds to a particular routine of a software application;
generating a graphical representation of the code call tree in relation to two or more performance properties;
causing the graphical representation of the code call tree to be displayed;
allowing a user to graphically select a group of routines from the graphical representation of the code call tree;
creating a filtered code call tree comprising the graphically selected group of routines;
generating a drill-down visualization of the filtered code call tree;
wherein the drill-down visualization comprises a heat map of the filtered code call tree, the heat map graphically indicating a number of calls to each routine of the filtered code call tree; and
causing the drill-down visualization to be displayed.

2. The method of claim 1, wherein the graphical representation comprises a plot of the routines of the code call tree in relation to the two or more performance properties.

3. The method of claim 1, wherein the creating of the filtered code call tree comprises automatically identifying one or more additional routines based, at least in part, on an analysis of the code call tree, the filtered code call tree comprising the one or more additional routines.

4. The method of claim 3, wherein the one or more additional routines comprise routines that, in the code call tree, are immediate parents of one or more of the graphically selected group of routines.

5. The method of claim 3, wherein the one or more additional routines comprise routines that, in the code call tree, are immediate children of one or more of the graphically selected group of routines.

6. The method of claim 1, comprising:
allowing the user to graphically select a subsequent group of routines from the drill-down visualization;
creating a subsequent filtered code call tree comprising the graphically selected subsequent group of routines;
creating a subsequent drill-down visualization of the subsequent filtered code call tree; and
causing the subsequent drill-down visualization to be displayed.

7. The method of claim 6, wherein the subsequent drill-down visualization comprises a histogram of routine call counts.

8. The method of claim 1, wherein the two or more performance properties comprise, for each routine of the routines:
a point on a transaction timeline at which the routine was called;
information related to an execution time of the routine; and
information related to a property of the routine.

9. The method of claim 8, wherein the information related to an execution time of the routine comprises an exclusive execution time of the routine.

10. An information handling system comprising:
at least one processor, wherein the processor is operable to implement a method comprising:
accessing a code call tree for an end-user transaction, wherein the code call tree traces routines called during execution of the end-user transaction, wherein each node in the code call tree corresponds to a particular routine of a software application;
generating a graphical representation of the code call tree in relation to two or more performance properties;
causing the graphical representation of the code call tree to be displayed;
allowing a user to graphically select a group of routines from the graphical representation of the code call tree;
creating a filtered code call tree comprising the graphically selected group of routines;
generating a drill-down visualization of the filtered code call tree;
wherein the drill-down visualization comprises a heat map of the filtered code call tree, the heat map graphically indicating a number of calls to each routine of the filtered code call tree; and
causing the drill-down visualization to be displayed.

11. The information handling system of claim 10, wherein the graphical representation comprises a plot of the routines of the code call tree in relation to the two or more performance properties.

12. The information handling system of claim 10, wherein the creating of the filtered code call tree comprises automatically identifying one or more additional routines based, at least in part, on an analysis of the code call tree, the filtered code call tree comprising the one or more additional routines.

13. The information handling system of claim 12, wherein the one or more additional routines comprise routines that, in the code call tree, are immediate parents of one or more of the graphically selected group of routines.

14. The information handling system of claim 12, wherein the one or more additional routines comprise routines that, in the code call tree, are immediate children of one or more of the graphically selected group of routines.

15. The information handling system of claim 10, the method comprising:
allowing the user to graphically select a subsequent group of routines from the drill-down visualization;
creating a subsequent filtered code call tree comprising the graphically selected subsequent group of routines;
creating a subsequent drill-down visualization of the subsequent filtered code call tree; and
causing the subsequent drill-down visualization to be displayed.

16. The information handling system of claim 15, wherein the subsequent drill-down visualization comprises a histogram of routine call counts.

17. The information handling system of claim 10, wherein the two or more performance properties comprise, for each routine of the routines:
a point on a transaction timeline at which the routine was called;
information related to an execution time of the routine; and
information related to a property of the routine.

18. The information handling system of claim 17, wherein the information related to an execution time of the routine comprises an exclusive execution time of the routine.

19. A computer-program product comprising a non-transitory computer-usable medium having computer-readable program code embodied therein, the computer-readable program code adapted to be executed to implement a method comprising:
accessing a code call tree for an end-user transaction, wherein the code call tree traces routines called during execution of the end-user transaction, wherein each node in the code call tree corresponds to a particular routine of a software application;
generating a graphical representation of the code call tree in relation to two or more performance properties;
causing the graphical representation of the code call tree to be displayed;
allowing a user to graphically select a group of routines from the graphical representation of the code call tree;
creating a filtered code call tree comprising the graphically selected group of routines;
generating a drill-down visualization of the filtered code call tree;
wherein the drill-down visualization comprises a heat map of the filtered code call tree, the heat map graphically indicating a number of calls to each routine of the filtered code call tree; and
causing the drill-down visualization to be displayed.

* * * * *